United States Patent
Kwon et al.

(10) Patent No.: US 10,991,926 B2
(45) Date of Patent: Apr. 27, 2021

(54) SEPARATOR HAVING ELECTRODE ADHESIVE LAYER AND ELECTROCHEMICAL DEVICE INCLUDING THE SAME

(71) Applicant: LG CHEM, LTD., Seoul (KR)

(72) Inventors: Hye-Jin Kwon, Daejeon (KR); So-Mi Jeong, Daejeon (KR); Ji-Eun Kim, Daejeon (KR); Joo-Sung Lee, Daejeon (KR); Sun-Mi Jin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 108 days.

(21) Appl. No.: 15/768,176

(22) PCT Filed: Nov. 11, 2016

(86) PCT No.: PCT/KR2016/012999
§ 371 (c)(1),
(2) Date: Apr. 13, 2018

(87) PCT Pub. No.: WO2017/082671
PCT Pub. Date: May 18, 2017

(65) Prior Publication Data
US 2018/0315971 A1    Nov. 1, 2018

(30) Foreign Application Priority Data

Nov. 11, 2015 (KR) .................. 10-2015-0158312
Nov. 11, 2015 (KR) .................. 10-2015-0158322

(51) Int. Cl.
*H01M 2/16*       (2006.01)
*H01M 10/052*    (2010.01)
*H01M 10/0525*   (2010.01)

(52) U.S. Cl.
CPC .......... *H01M 2/1686* (2013.01); *H01M 2/16* (2013.01); *H01M 2/166* (2013.01);
(Continued)

(58) Field of Classification Search
CPC .. H01M 2/1686; H01M 2/1653; H01M 2/166; H01M 2/16; H01M 10/052; H01M 10/0525; Y02E 60/122; Y02T 10/7011
See application file for complete search history.

(56) References Cited

U.S. PATENT DOCUMENTS 10,002,719 B2 * 6/2018 Ha ..................... H01G 11/52
10,038,174 B2   7/2018 Lee et al.
(Continued)

FOREIGN PATENT DOCUMENTS

CN    102630353 A    8/2012
CN    103262297 A    8/2013
(Continued)

OTHER PUBLICATIONS

International Search Report (PCT/ISA/210) issued in PCT/KR2016/012999, dated Feb. 28, 2017.
(Continued)

*Primary Examiner* — Raymond Alejandro
(74) *Attorney, Agent, or Firm* — Birch, Stewart, Kolasch & Birch, LLP

(57) ABSTRACT

Disclosed are a separator having an electrode adhesive layer and an electrochemical device including the same. The electrode adhesive layer includes organic particles and an acrylic resin binder. Preferably, the acrylic resin binder is present in an amount of 30 wt % or more, so that a film-shaped electrode adhesive layer can be formed even when the organic particles have a particle diameter smaller than that of the pores of the underlying substrate or voids of the underlying porous coating layer.

9 Claims, 8 Drawing Sheets

(52) U.S. Cl.
CPC ....... *H01M 2/1653* (2013.01); *H01M 10/052* (2013.01); *H01M 10/0525* (2013.01); *Y02E 60/10* (2013.01); *Y02T 10/70* (2013.01)

(56) References Cited

U.S. PATENT DOCUMENTS

| | | | |
|---|---|---|---|
| 2012/0189897 | A1 | 7/2012 | Wakizaka et al. |
| 2013/0011715 | A1 | 1/2013 | Lee et al. |
| 2013/0244082 | A1 | 9/2013 | Lee et al. |
| 2014/0363726 | A1 | 12/2014 | Honda et al. |
| 2015/0236323 | A1 | 8/2015 | Honda et al. |
| 2015/0303003 | A1* | 10/2015 | Ha .................... H01G 11/52 429/400 |
| 2015/0311490 | A1 | 10/2015 | Murase et al. |
| 2015/0333308 | A1 | 11/2015 | Toyoda et al. |
| 2016/0204407 | A1* | 7/2016 | Kai .................... C05F 7/00 429/144 |
| 2016/0218340 | A1 | 7/2016 | Ryu et al. |
| 2016/0268565 | A1 | 9/2016 | Sasaki et al. |

FOREIGN PATENT DOCUMENTS

| | | |
|---|---|---|
| CN | 103493253 A | 1/2014 |
| CN | 104221184 A | 12/2014 |
| CN | 104769753 A | 7/2015 |
| JP | 2012-199253 A | 10/2012 |
| KR | 10-2013-0006256 A | 1/2013 |
| KR | 10-2014-0050877 A | 4/2014 |
| KR | 10-2014-0066786 A | 6/2014 |
| KR | 10-2014-0114428 A | 9/2014 |
| KR | 10-2014-0124322 A | 10/2014 |
| KR | 10-1535198 B1 | 7/2015 |
| WO | WO 2015/037552 A1 | 3/2015 |
| WO | WO 2015/064411 A1 | 5/2015 |
| WO | WO 2015/093852 A1 | 6/2015 |

OTHER PUBLICATIONS

English Translation of Written Opinion of the International Searching Authority for Appl. No. PCT/KR2016/012999 dated Feb. 28, 2017.

* cited by examiner

SEPARATOR HAVING ELECTRODE ADHESIVE LAYER AND ELECTROCHEMICAL DEVICE INCLUDING THE SAME

TECHNICAL FIELD

The present application claims priority to Korean Patent Application No. 10-2015-0158312 filed on Nov. 11, 2015 and Korean Patent Application No. 10-2015-0158322 filed on Nov. 11, 2015 in the Republic of Korea, the disclosures of which are incorporated herein by reference.

The present disclosure relates to a separator having an electrode adhesive layer and an electrochemical device including the same.

BACKGROUND ART

Recently, energy storage technology has been given increasing attentions. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused.

Continuous studies have developed some electrochemical devices having significantly improved performance, particularly output, through electrode active materials. Among the commercially available secondary batteries, lithium secondary batteries developed in the early 1990's have been spotlighted, since they have a higher driving voltage and significantly higher energy density as compared to conventional batteries, such as Ni-MH batteries.

Such electrochemical devices use a separator to prevent a short-circuit between electrodes. A higher degree of adhesion in the binding between an electrode and a separator may contribute to the safety of a battery.

For this purpose, a separator having improved bindability with an electrode has been suggested in the art by forming an electrode adhesive layer on the outermost layer of a separator. However, the separator has a problem in that the electrode adhesive layer blocks the pores formed on the surface of the separator and/or the particles forming the electrode adhesive layer infiltrate into the pores, thereby significantly reducing the air permeability of the separator and/or increasing the electrical resistance of a battery.

DISCLOSURE

Technical Problem

The present disclosure is designed to solve the problems of the related art, and therefore the present disclosure is directed to providing a separator having an electrode adhesive layer that shows improved close contact and adhesion to an electrode. Particularly, the present disclosure is directed to providing a separator having an electrode adhesive layer that shows improved close contact and adhesion to an electrode, even when the particles forming the electrode adhesive layer have a diameter smaller than that of the pores of an underlying constitutional element located under the electrode adhesive layer.

In addition, the present disclosure is directed to providing a separator having an electrode adhesive layer that shows improved adhesion to an underlying constitutional element, such as a porous polymer substrate or porous coating layer.

In addition, the present disclosure is directed to providing a separator which can prevent or minimize blocking of the pores of the separator and infiltration into the pores.

Further, the present disclosure is directed to providing an electrochemical device including the separator and having improved battery safety.

Technical Solution

In one aspect of the present disclosure, there is provided a separator for an electrochemical device, including: a porous polymer substrate; and an electrode adhesive layer formed on at least one surface of the porous polymer substrate and including organic particles and an acrylic resin binder.

In another aspect of the present disclosure, there is provided a separator for an electrochemical device, including: a porous polymer substrate; a porous coating layer formed on at least one surface of the porous polymer substrate and including inorganic particles and a binder polymer; and an electrode adhesive layer formed on the outermost surface of the separator and including organic particles and an acrylic resin binder.

The organic particles may have an average diameter smaller than that of the pores formed in the porous polymer substrate or porous coating layer located directly under the electrode adhesive layer.

The acrylic resin binder may be present in an amount of 30-80 wt % based on the combined weight of the organic particles and the acrylic resin binder.

The organic particles may be any one or at least two polymers or copolymers selected from the group consisting of polyvinylidene fluoride, polyvinylidene fluoride-co-hexafluoropropylene, polyvinylidene fluoride-co-trichloroethylene, polymethyl methacrylate, polyacrylonitrile, polyvinyl acetate, polyethylene-co-vinyl acetate, polyimide and polyethylene oxide.

The organic particles may have an average particle diameter of 0.05-0.5 μm.

The acrylic resin binder may have a glass transition temperature of −50 to 60° C.

The acrylic resin binder may be any one or at least two selected from the group consisting of ethyl acrylate-acrylic acid-N,N-dimethylacrylamide copolymer, ethyl acrylate-acrylic acid-2-(dimethylamino)ethyl acrylate copolymer, ethyl acrylate-acrylic acid-N,N-diethylacrylamide copolymer and ethyl acrylate-acrylic acid-2-(diethylamino)ethyl acrylate copolymer.

The organic particles and the acrylic resin binder may be used at a weight ratio of 1:1-500:1.

The electrode adhesive layer may be formed in a film shape in at least 20% of the surface area of the separator.

The electrode adhesive layer may have a thickness of 0.01-1.0 μm.

The porous polymer substrate may be a film or non-woven web including any one or at least two selected from the group consisting of polyethylene, polypropylene, polyethylene terephthalate, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene oxide, cyclic olefin copolymer, polyphenylene sulfide and polyethylene naphthalene The inorganic particles may be inorganic particles having a dielectric constant of 5 or more, inorganic particles capable of transporting lithium ions or a mixture thereof The binder polymer may be any one or at least two selected from the group consisting of polymethyl methacrylate, polyacrylonitrile, polyvinyl pyrrolidone, polyvinyl acetate, polyethyleneco-vinyl acetate, polyethylene oxide, cellulose acetate, cellulose acetate butyrate, cellulose acetate propionate, cyanoethylpullulan, cyanoethyl polyvinylalcohol, cyanoethyl cellulose, cyanoethyl sucrose, pullulan, carboxyl methyl cellulose, acrylonitrile-styrene-butadiene copolymer and polyimide.

In still another aspect of the present disclosure, there is provided an electrochemical device including a positive electrode, a negative electrode and a separator interposed between the positive electrode and the negative electrode, wherein the separator is the above-described separator.

The electrochemical device may be a lithium secondary battery.

Advantageous Effects

The separator according to an embodiment of the present disclosure prevents or minimizes an infiltration phenomenon into the pores or voids of the underlying constitutional element, even when the particles forming the electrode adhesive layer have an average diameter smaller than that of the pores or voids of the underlying constitutional element located under the electrode adhesive layer. In addition, the separator shows high adhesion to an electrode, thereby providing excellent bindability.

In addition, in the electrode adhesive layer, the acrylic resin binder has an effect of anchoring the organic particles to the underlying constitutional element, such as a porous polymer substrate or porous coating layer, and thus can provide excellent bindability to the underlying constitutional element.

In addition, since voids are present among the organic particles forming the electrode adhesive layer, it is possible to solve the problem of degradation of air permeability of the separator.

Further, the present disclosure provides an electrochemical device including the separator and thus having improved safety and performance.

DESCRIPTION OF DRAWINGS

The accompanying drawings illustrate a preferred embodiment of the present disclosure and the present disclosure is not construed as being limited to the drawing. It is also to be understood that some constitutional elements in the accompanying drawings are exaggerated/reduced or omitted to make the description of the features of the present disclosure clear.

BEST MODE

Hereinafter, preferred embodiments of the present disclosure will be described in detail. However, the following embodiments are for illustrative purposes only and not intended to limit the scope of this disclosure defined by the following claims.

In one aspect of the present disclosure, there is provided a separator for an electrochemical device, including: a porous polymer substrate; and an electrode adhesive layer formed on at least one surface of the porous polymer substrate and including organic particles and an acrylic resin binder.

In another aspect of the present disclosure, there is provided a separator for an electrochemical device, including: a porous polymer substrate; a porous coating layer formed on at least one surface of the porous polymer substrate and including inorganic particles and a binder polymer; and an electrode adhesive layer formed on the outermost surface of the separator and including organic particles and an acrylic resin binder.

The organic particles may have an average diameter smaller than that of the pores formed in the porous polymer substrate or porous coating layer located directly under the electrode adhesive layer.

The acrylic resin binder may be present in an amount of 30-80 wt % based on the combined weight of the organic particles and the acrylic resin binder.

The porous substrate or porous coating layer located under the electrode adhesive layer may have a surface roughness $R_a$ of 10-200 nm.

Figure 1A:
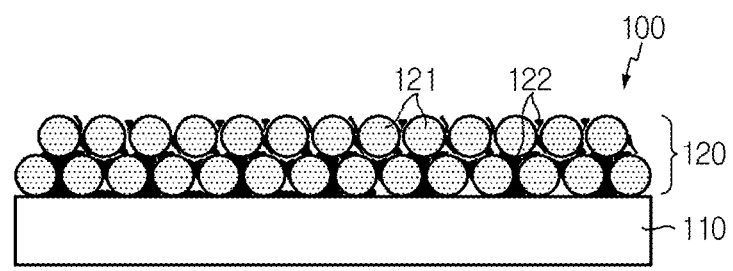
FIG. 1a is a schematic sectional view illustrating a separator including a porous polymer substrate and an electrode adhesive layer formed on one surface of the porous polymer substrate according to an embodiment of the present disclosure.

Referring to the accompanying drawings, the separator 100 of FIG. 1a includes: a porous polymer substrate 110; and an electrode adhesive layer 120 formed on at least one surface of the porous polymer substrate 110 and including organic particles 121 and an acrylic resin binder 122.

Figure 1B:
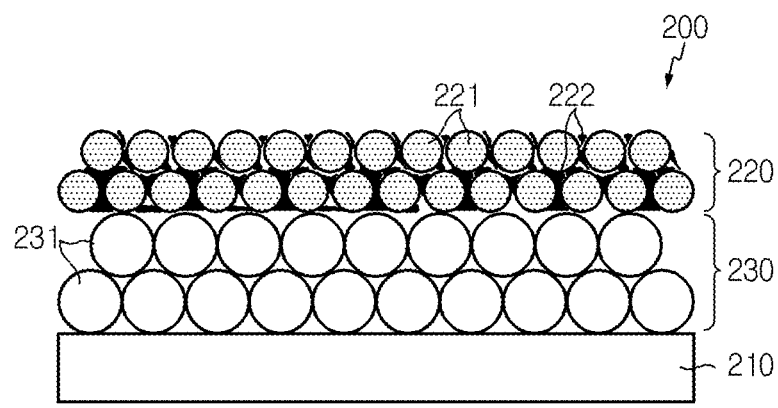
FIG. 1b is a schematic sectional view illustrating a separator including a porous polymer substrate, a porous coating layer formed on one surface of the porous polymer substrate, and an electrode adhesive layer formed on the porous coating layer according to another embodiment of the present disclosure.

In addition, the separator 200 of FIG. 1b includes: a porous polymer substrate 210; a porous coating layer 230 formed on at least one surface of the porous polymer substrate 210 and including inorganic particles 231 and a binder polymer (not shown); and an electrode adhesive layer 220 formed on the porous coating layer 230 and including organic particles 221 and an acrylic resin binder 222.

The organic particles have to form an electrode adhesive layer on the outermost layer of the separator and to show adhesiveness to the electrode surface. According to the related art, an electrode adhesive layer was formed from slurry prepared by dispersing and selling or dissolving an organic binder polymer into a solvent. However, such an electrode adhesive layer significantly reduces the air permeability of a separator and significantly increases electric resistance. On the contrary, according to the present disclosure, a vitrified acrylic resin binder allows organic particles to be fixed and bound to form a film-shaped electrode adhesive layer and the electrode adhesive layer has voids formed among the organic particles, thereby ensuring the air permeability of a separator. In addition, the electrode adhesive layer may be formed only at a part of the porous coating layer to contribute to ensuring the air permeability of a separator.

The organic particles may be any one or at least two polymers or copolymers selected from the group consisting of polyvinylidene fluoride, polyvinylidene fluoride-co-hexafluoropropylene, polyvinylidene fluoride-co-trichloro-ethylene, polymethyl methacrylate, polyacrylonitrile, polyvinyl acetate, polyethylene-co-vinyl acetate, polyimide and polyethylene oxide, but is not limited thereto. In addition, the organic particles should not be dissolved in a solvent of slurry for forming an electrode adhesive layer or an electrolyte.

The organic particles may have an average diameter smaller than that of the pores formed in the underlying constitutional element located under the electrode adhesive layer. For example, the organic particles may have an average particle diameter of 0.05-0.5 µm, preferably an average particle diameter of 0.1-0.4 µm, and more preferably an average particle diameter of 0.15-0.3 µm. When the organic particles have the above-defined range of average particle diameter, it is possible to form an electrode adhesive layer that shows excellent adhesion to an electrode while not providing an electrode adhesive layer with an excessively large thickness.

The acrylic resin binder is vitrified while it undergoes a process at a range of temperature higher than its glass transition temperature. Herein, organic particles having a smaller diameter that that of the pores of the porous polymer substrate or voids of the porous coating layer are not introduced into the pores of the porous polymer substrate or voids of the porous coating layer but are located on the surface to form an electrode adhesive layer. Particularly, when an electrode adhesive layer is formed on the porous polymer substrate, the contact area of the organic particles to the substrate is small, thereby making it difficult to form an electrode adhesive layer. However, the acrylic resin binder improves the bindability among organic particles, and thus significantly contributes to formation of an electrode adhesive layer. In this context, the acrylic resin binder may have a glass transition temperature of −50 to 60° C.

Such an acrylic resin binder may include any one or at least two functional groups selected from the group consisting of OH, COOH, CN, amine and amide groups. Non-limiting examples of the acrylic resin binder may be any one or at least two selected from the group consisting of ethyl acrylate-acrylic acid-N,N-dimethylacrylamide copolymer, ethyl acrylate-acrylic acid-2-(dimethylamino)ethyl acrylate copolymer, ethyl acrylate-acrylic acid-N,N-diethylacrylamide copolymer and ethyl acrylate-acrylic acid-2-(diethylamino)ethyl acrylate copolymer. The acrylic resin binder should not be reactive to an electrolyte.

In addition, the acrylic resin binder may be present in an amount of 30-80 wt % based on the combined weight of the organic particles and the acrylic resin binder. When the acrylic resin binder is present in the above-defined range of amount, it is possible to provide an adequate air permeation time while realizing adhesion. When the content of the acrylic resin binder is smaller than the lower limit, introduction of the organic particles into the substrate or porous coating layer is increased. When the content of the acrylic resin binder is larger than the upper limit, the air permeability of the separator and resistance may be deteriorated.

The electrode adhesive layer may be formed in a film shape in at least 20% of the surface area of the separator. When the electrode adhesive layer is formed in a surface area region less than 20% of the surface area of the separator, it is not possible to improve adhesion to a desired degree. In addition, when the electrode adhesive layer is present in 80% or less of the surface area of the separator, it is possible to facilitate transport of ions or an electrolyte. To accomplish this, the electrode adhesive layer may be formed only at a part of the separator surface or formed in a predetermined pattern, such as a shape of stripes or dots, over the whole surface of the separator.

In addition, the electrode adhesive layer may have a thickness of 0.01-1.0 µm. When the electrode adhesive layer has the above-defined range of thickness, it is possible to provide preferred adhesion, air permeability and resistance.

The porous polymer substrate forming the separator may be any porous polymer substrate, as long as it is used conventionally for an electrochemical device. Non-limiting examples of the porous polymer substrate may be a film or non-woven web including any one or at least two selected from the group consisting of polyethylene, polypropylene, polyethylene terephthalate, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene oxide, cyclic olefin copolymer, polyphenylene sulfide and polyethylene naphthalene.

Although there is no particular limitation in the thickness of the porous polymer substrate, the porous polymer substrate may have a thickness of about 5-50 µm. In addition, the pore size and porosity of the pores present in the porous polymer substrate are not limited, but may be about 0.01 µm-about 50 µm and about 10%-95%, respectively.

The porous coating layer is a layer coated and formed on at least one surface of the porous polymer surface, and includes inorganic particles and a binder polymer mixed and dispersed therein. In the porous coating layers, the inorganic particles are bound among themselves by the binder polymer, and thus interstitial volumes are formed among the inorganic particles and the interstitial volumes may become vacant spaces to form pores. In other words, the binder polymer attaches the inorganic particles to each other so that they may retain their binding states. For example, the binder polymer connects and fixes the inorganic particles with each other. According to another embodiment, the pores of the porous coating layer are those formed by the interstitial volumes among the inorganic particles which become vacant spaces, and may be a space defined by the inorganic particles facing each other substantially in a closely packed or densely packed structure of the inorganic particles. The pores of the porous coating layer can provide a tunnel through which lithium ions essential for driving a battery are transported smoothly.

Formation of interstitial volumes among the inorganic particles contributes to ensuring the porosity and pore size of the porous coating layer. In order to form a packed structure of inorganic particles forming a porous structure through the interstitial volumes, it is preferred that the weight ratio of the inorganic particles to the binder polymer contained in the porous coating layer is 50:50 to 99:1, more preferably 70:30 to 95:5. When the content of the inorganic particles is at least 50:50, it contributes to the thermal stability of the separator. When the content of the inorganic particles is larger than 99 parts by weight, the content of the binder polymer is low relatively, and thus the peeling resistance of the porous coating layer may be degraded.

There is no particular limitation in the inorganic particles, as long as they are electrochemically stable. In other words, the inorganic particles applicable to the present disclosure are not particularly limited, as long as they cause no oxidation and/or reduction in a range of driving voltage (such as 0 to about 5V based on Li/Li$^+$) of the corresponding electrochemical device. Particularly, when using inorganic particles capable of transporting ions, it is possible to increase the ion conductivity in an electrochemical device and thus to contribute to improvement of performance.

When using inorganic particles having a high dielectric constant, it is possible to contribute to an increase in a dissociation degree of the electrolyte salt, such as a lithium salt, in a liquid electrolyte, and thus to improve the ion conductivity of the electrolyte.

Although there is no particular limitation in the type of inorganic particles used in the present disclosure, it is possible to use inorganic particles having a dielectric constant of 5 or more, inorganic particles capable of transporting lithium ions or a mixture thereof.

Non-limiting examples of the inorganic particles having a dielectric constant of 5 or more include $Al_2O_3$, AlOOH, γ-AlOOH, MgO, $Mg(OH)_2$, $CaCO_3$, $SiO_2$, $TiO_2$, $BaTiO_3$, $BaSO_4$, $Pb(Zr_x,Ti_{1-x})O_3$ (PZT, $0<x<1$), $Pb_{1-x}La_xZr_{1-y}Ti_yO_3$ (PLZT), $(1-x)Pb(Mg_{1/3}Nb_{2/3})O_3$-$xPbTiO_3$(PMN-PT, $0<x<1$), hafnia ($HfO_2$), $SrTiO_3$, $SnO_2$, $CeO_2$, NiO, CaO, ZnO, $ZrO_2$, $Y_2O_3$, SiC, or the like.

Non-limiting examples of the inorganic particles capable of transporting lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$), or the like.

Although there is no limitation in the size of inorganic particles, the inorganic particles may have a particle diameter of about 0.01-about 10 μm or about 0.05-about 1.0 μm in view of formation of a coating layer having a uniform thickness and an adequate porosity. When the particle diameter of the inorganic particles satisfies the above-defined range, it is possible to improve the dispersibility and to control the physical properties of the separator with ease. It is also possible to increase the thickness of the porous coating layer and thus to prevent the problems of degradation of mechanical properties and generation of an internal short-circuit caused by an excessively large pore size during charging/discharging of a battery.

Preferably, the binder polymer that may be used in the present disclosure may be a binder polymer having a glass transition temperature ($T_g$) of −200 to 200° C. This is because such a binder polymer can improve the mechanical properties, such as flexibility and elasticity, of the finally formed coating layer.

Non-limiting examples of the binder polymer may be any one selected from the group consisting of polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethyl cellulose, cyanoethyl sucrose, pullulan, carboxyl methyl cellulose, acrylonitrile-styrene-butadiene copolymer and polyimide, or a mixture of at least two of them.

The porous coating layer may be formed to a thickness of 0.01-10 μm based on one surface of the porous polymer substrate. When the porous coating layer has a thickness less than 0.01 μm, it is difficult to ensure sufficient heat resistance. When the porous coating layer has a thickness larger than 10 μm, the resistance of the separator is increased, resulting in degradation of the quality of a battery.

In addition to the inorganic particles and the binder polymer, the other additives used conventionally in the art may be further incorporated as ingredients of the porous coating layer.

The separator according to the present disclosure may be obtained by forming an electrode adhesive layer as the outermost layer. Hereinafter, the method for manufacturing the separator according to the present disclosure will be described with reference to an embodiment including a porous polymer substrate, a porous coating layer and an electrode adhesive layer, but the scope of the present disclosure is not limited thereto.

First, a planar porous polymer substrate having pores is prepared (Step S1).

See the above description with reference to the porous polymer substrate.

Next, a binder polymer is introduced to a solvent so that it may be swelled or dissolved therein, inorganic particles are added thereto to provide slurry for forming a porous coating layer, and the slurry is coated on at least one surface of the porous polymer substrate (Step S2).

See the above description with reference to the inorganic particles and binder polymer.

The solvent preferably has a solubility parameter similar to the solubility parameter of the binder polymer to be used and a low boiling point. This is intended to facilitate uniform mixing and subsequent solvent removal. Non-limiting examples of the solvent may include acetone, tetrahydrofuran, methylene chloride, chloroform, dimethyl formamide, N-methyl-2-pyrrolidone, methyl ethyl ketone and cyclohexane, or a mixture thereof.

After the binder polymer is dissolved or dispersed into the solvent, inorganic particles are added thereto and dispersed therein to prepare slurry for forming a porous coating layer. The inorganic particles may be pulverized to an adequate size and then added, or may be added and then dispersed while pulverizing them by using a ball milling process, or the like The slurry for forming a porous coating layer is coated on one surface or both surfaces of the porous polymer substrate continuously or discontinuously by using various processes, such as dip coating, slot die coating, slide coating and curtain coating.

Then, slurry for forming an electrode adhesive layer is prepared, coated and dried (Step S3).

See the above description with reference to the types and contents of the organic particles and the acrylic resin binder used to form the electrode adhesive layer.

In this step, the acrylic resin binder is dispersed into the solvent and the organic particles are added thereto and dispersed therein. The solvent used to form the electrode adhesive layer may be the same as or different from the solvent used to form the slurry for forming a porous coating layer. Particular examples of the solvent include acetone, water or a mixture thereof, and water is preferred in terms of eco-friendliness and cost efficiency.

The slurry for forming an electrode adhesive layer is coated on the porous coating layer. The same process as the process used for coating the slurry for forming a porous coating layer may be used, or another process may be used.

Then, the solvent of the slurry for forming an electrode adhesive layer is dried. During the drying, the acrylic resin binder should be vitrified so that the organic particles may be bound with each other to form a film-shaped electrode adhesive layer. Thus, the drying temperature should be set to a temperature higher than the glass transition temperature of the acrylic resin binder. In this manner, the acrylic resin binder is vitrified so that it may be present in the form of a film on the outermost surface of the separator. For example, the drying temperature may be set to 60-150° C.

The resultant separator may be interposed between a positive electrode and a negative electrode and heated or pressurized so that it may be adhered to an electrode while showing excellent close contact and adhesion.

In another aspect, there is provided an electrochemical device including a positive electrode, a negative electrode and a separator interposed between the positive electrode and the negative electrode.

The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer secondary batteries, are preferred.

The electrochemical device may be obtained according to the conventional method known to those skilled in the art. For example, the electrochemical device may be obtained by interposing the above-described separator between a positive electrode and a negative electrode to form an electrode assembly and injecting an electrolyte thereto.

The electrodes to be used in combination with the separator according to the present disclosure are not particularly limited and may be obtained by binding an electrode active material to an electrode current collector according to the conventional method known to those skilled in the art.

Among such electrode active materials, non-limiting examples of a positive electrode active material include conventional positive electrode active materials that may be used in the positive electrodes of the conventional electrochemical devices. Particularly, it is preferred to use lithium manganese oxide, lithium cobalt oxide, lithium nickel oxide, lithium iron oxide or a lithium composite oxide derived from the combination thereof.

Non-limiting examples of a negative electrode active material include conventional negative electrode active materials that may be used in the negative electrodes of the conventional electrochemical devices. Particularly, it is preferred to use materials capable of lithium intercalation, such as lithium metal or lithium alloys, carbon, petroleum coke, activated carbon, graphite or other carbonaceous materials.

Non-limiting examples of a positive electrode current collector include foil made of aluminum, nickel or a combination thereof. Non-limiting examples of a negative electrode current collector include foil made of copper, nickel, copper alloys or a combination thereof.

The electrolyte that may be used according to the present disclosure is a salt having a structure of $A^+B^-$, wherein g includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, a polyethylene porous film (Asahi, ND307B) having a thickness of 7 μm was prepared as a porous polymer substrate.

Next, 7000 g of inorganic particles ($Al_2O_3$, Nippon Light Metal, LS235, 500 nm) and 105 g of carboxymethyl cellulose (CMC) were introduced to water as a solvent and then crushed and pulverized by using a ball milling process for 3 hours to obtain slurry. The slurry included inorganic particles dispersed homogeneously therein and 700 g of a binder (acrylic resin, TRD202A) was introduced thereto before coating, and then the slurry was agitated for 1 hour. The slurry was coated onto both surfaces of polyethylene to a thickness of 3 μm through a dip coating process and then dried at 80° C.

Then, 1800 g of organic particles (PVdF-HFP, Solvay, XPH883, $T_m$ 100° C., average particle diameter 300 nm, solid content 25%) and 1125 g of an acrylic resin binder (acrylic resin, JSR, TRD202A, $T_g$ −5° C., solid content 40%) were introduced to water as a solvent to obtain slurry for forming an electrode adhesive layer (50 wt % of the acrylic resin binder based on the combined weight of the organic particles and the acrylic resin binder). The resultant slurry was coated onto the porous coating layer through a dip coating process and dried at 80° C. to form an electrode adhesive layer with a loading amount of 0.6 g/m².

Example 2

A separator having an electrode adhesive layer was obtained in the same manner as Example 1, except that 2520 g of organic particles (PVdF-HFP, Solvay, XPH883, $T_m$ 100° C., average particle diameter 300 nm, solid content 25%) and 675 g of an acrylic resin binder (acrylic resin, JSR, TRD202A, $T_g$ −5° C., solid content 40%) were used (30 wt % of the acrylic resin binder based on the combined weight of the organic particles and the acrylic resin binder).

Example 3

A separator was obtained in the same manner as Example 1, except that 40 wt % of the acrylic resin binder was used based on the combined weight of the organic particles and the acrylic resin binder.

Comparative Example 1

A separator having an electrode adhesive layer was obtained in the same manner as Example 1, except that 3240 g of organic particles (PVdF-HFP, Solvay, XPH883, $T_m$ 100° C., average particle diameter 300 nm, solid content 25%) and 225 g of an acrylic resin binder (acrylic resin, JSR, TRD202A, $T_g$ −5° C., solid content 40%) were used (10 wt % of the acrylic resin binder based on the combined weight of the organic particles and the acrylic resin binder).

Comparative Example 2

A separator was obtained in the same manner as Example 1, except that 20 wt % of the acrylic resin binder was used based on the combined weight of the organic particles and the acrylic resin binder.

Comparative Example 3

A separator was obtained in the same manner as Example 1, except that the organic particles and the acrylic resin binder were used at a ratio of 10:1 on the weight basis.

Comparative Example 4

A separator was obtained in the same manner as Example 1, except that the organic particles and the acrylic resin binder were used at a ratio of 15:1 on the weight basis.

Comparative Example 5

A separator was obtained in the same manner as Example 1, except that the organic particles and the acrylic resin binder were used at a ratio of 20:1 on the weight basis.

Comparative Example 6

A separator was obtained in the same manner as Example 1, except that the no acrylic resin binder was used.

Comparative Example 7

A separator was obtained in the same manner as Example 1, except that no electrode adhesive layer was formed.

Comparative Example 8

A polyethylene porous film (Asahi, ND307B) having a thickness of 7 μm was prepared as a separator.

Test Example 1

Figure 2A:
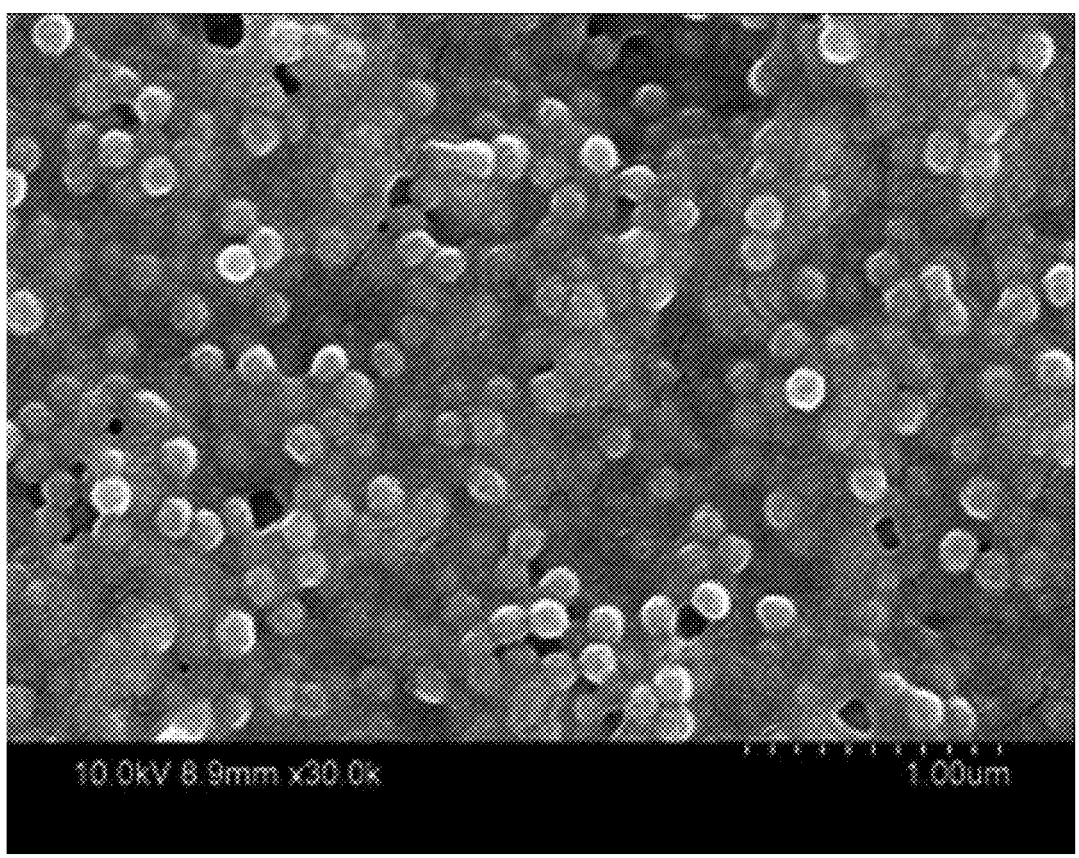
FIG. 2a is a scanning electron microscopic (SEM) image of the surface of the separator obtained according to Example 1 (acrylic resin binder 50%).
Figure 2B:
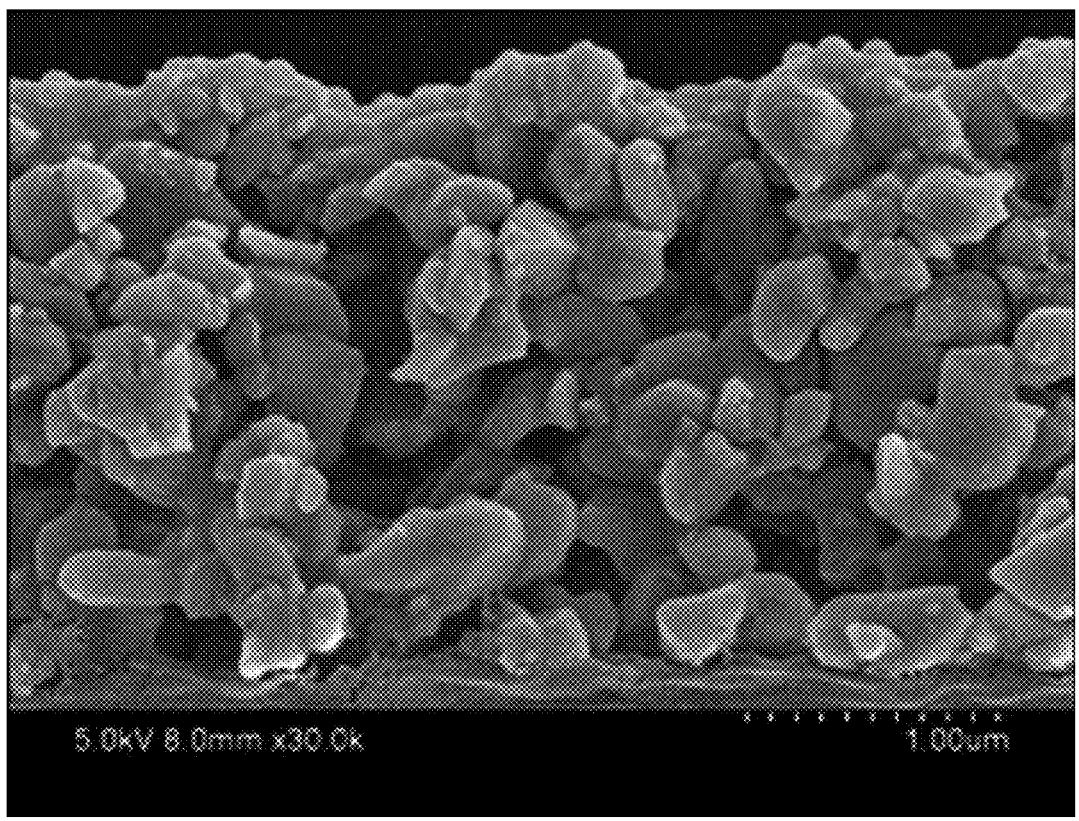
FIG. 2b is an SEM image of the sectional surface of the separator obtained according to Example 1 (acrylic resin binder 50%).
Figure 3A:
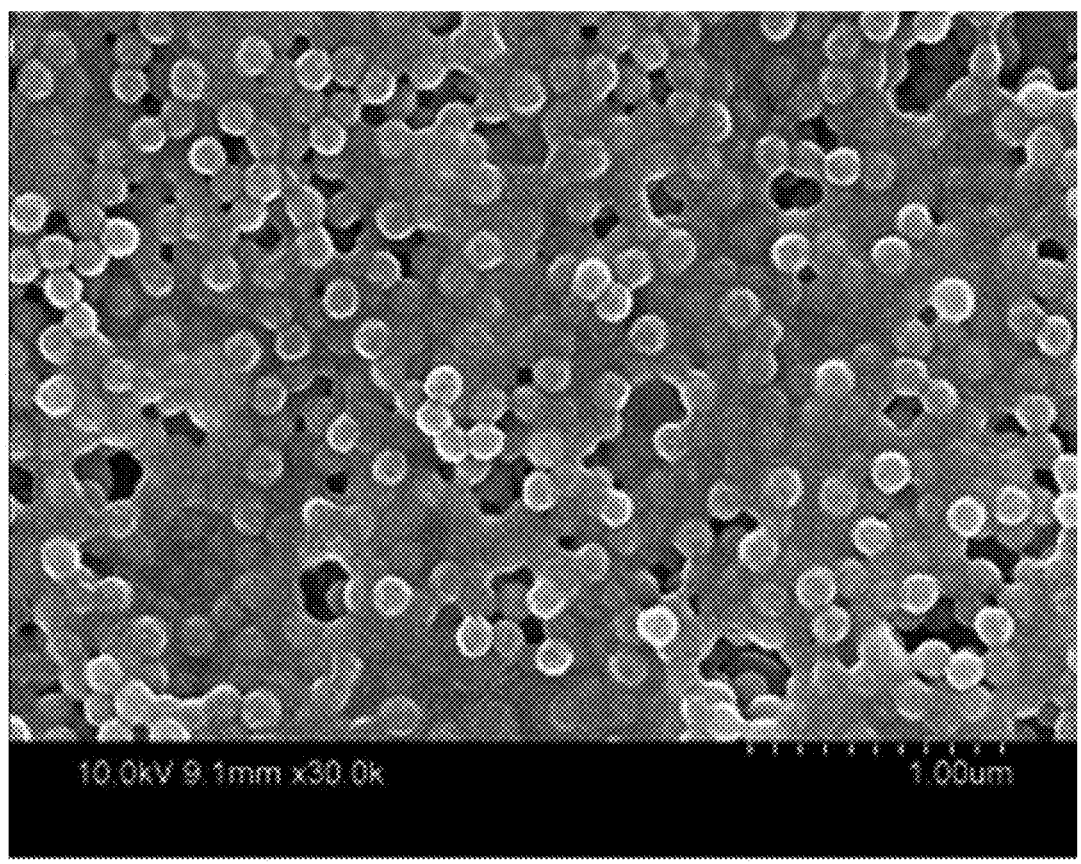
FIG. 3a is an SEM image of the surface of the separator obtained according to Example 2 (acrylic resin binder 30%).
Figure 3B:
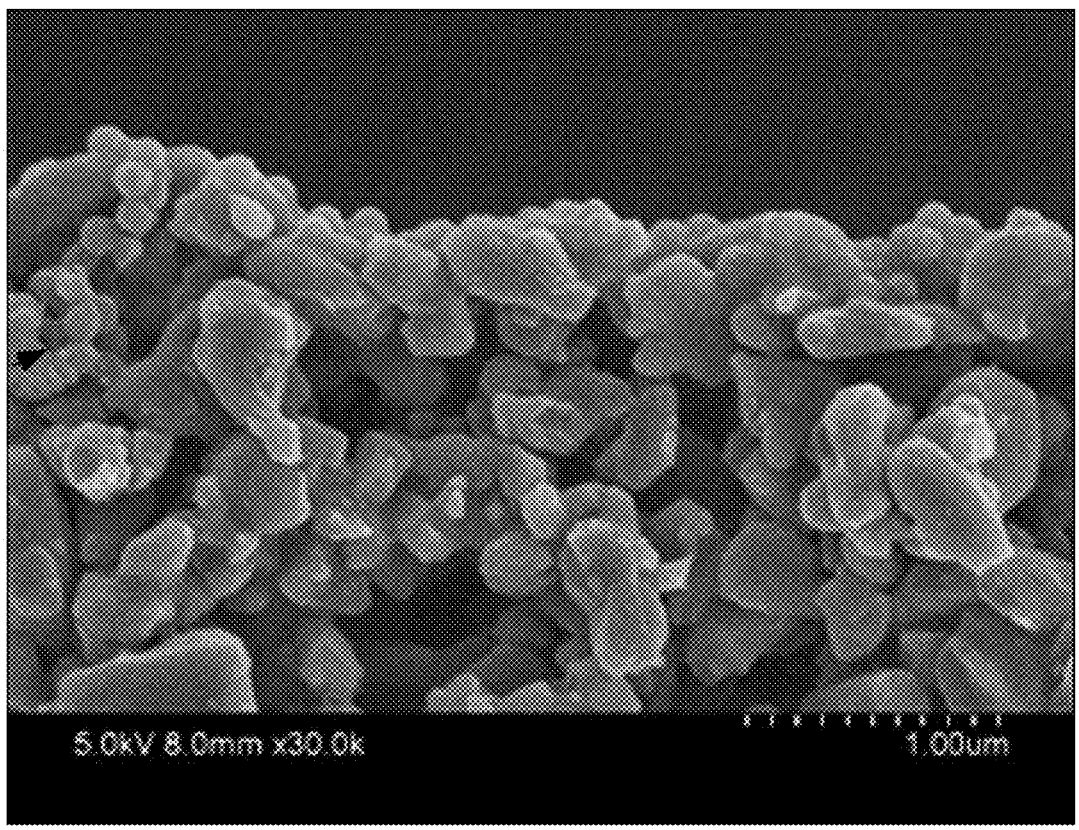
FIG. 3b is an SEM image of the sectional surface of the separator obtained according to Example 2 (acrylic resin binder 30%).
Figure 4A:
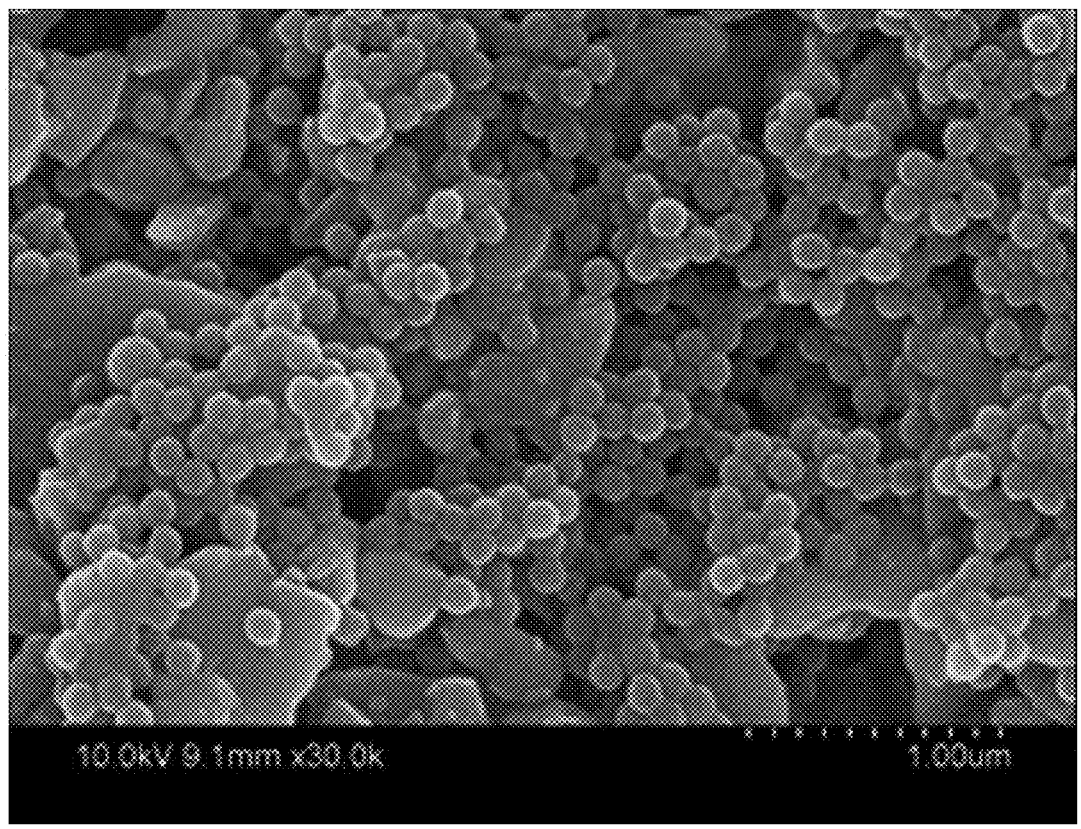
FIG. 4a is an SEM image of the surface of the separator obtained according to Comparative Example 1 (acrylic resin binder 10%).
Figure 4B:
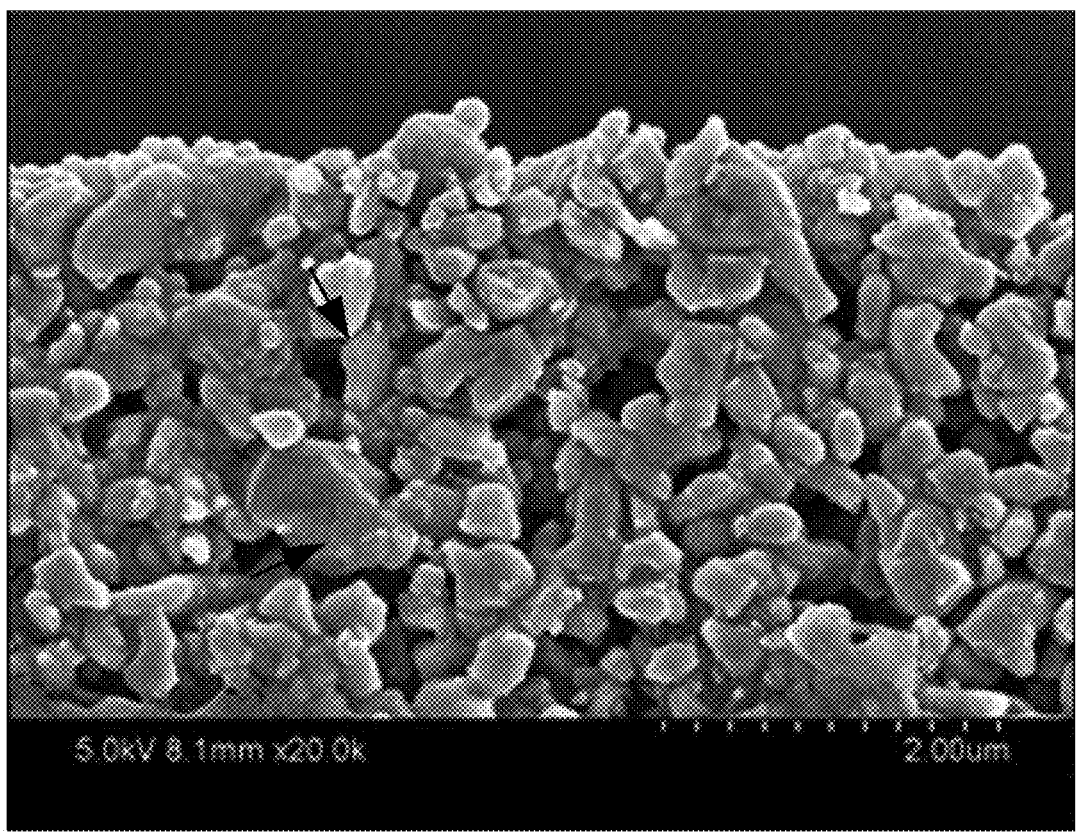
FIG. 4b is an SEM image of the sectional surface of the separator obtained according to Comparative Example 1 (acrylic resin binder 10%).

The surfaces and sections of the separators according to Example 1, Example 2 and Comparative Example 1 were photographed by scanning electron microscopy (SEM) and the images are shown in FIG. 2a/FIG. 2b, FIG. 3a/FIG. 3b, and FIG. 4a/FIG. 4b.

It can be seen from the separators according to Examples 1 and 2 that the acrylic resin binder allows the organic particles to be bound with each other to form an electrode adhesive layer on the surfaces of the separators while realizing adhesion. On the contrary, it can be seen from the separator according to Comparative Example 1 through the SEM images that no adhesive layer was formed due to a low content of the acrylic resin binder and the organic particles are introduced to the porous coating layer.

Test Example 2

Figure 5:
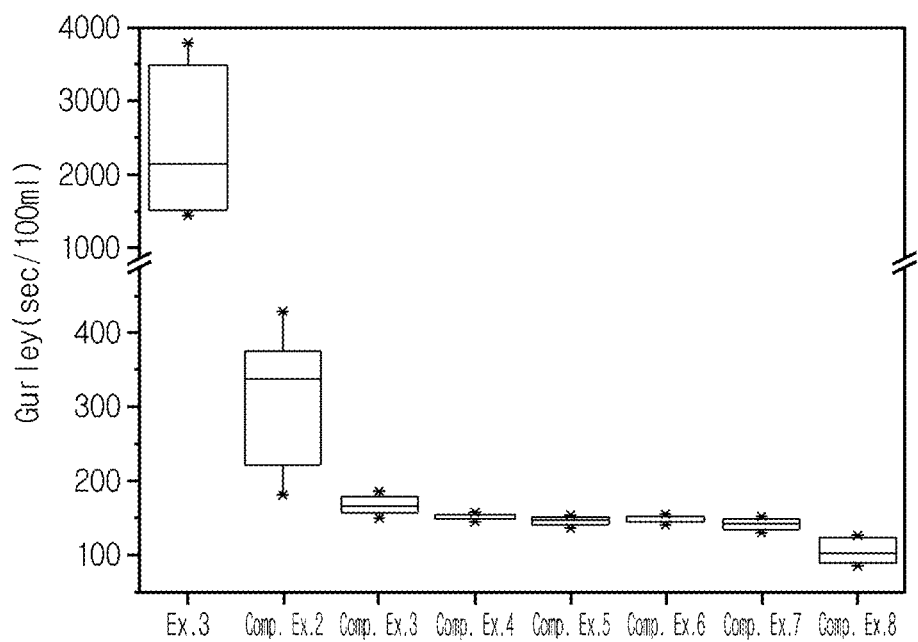
FIG. 5 is a graph illustrating the results of the test for air permeability of Example 3 and Comparative Examples 2-8.

The air permeability of each of Example 3 and Comparative Examples 2-8 was determined by using a digital Oken Type air permeability tester, EGO-IT (Asahi seiko), under a pressure of 0.5 kg/cm² for a setting time of 10 seconds. The results are shown in FIG. 5.

The present disclosure has been described in detail. However, it should be understood that the detailed description, while indicating preferred embodiments of the disclosure, are given by way of illustration only, since various combinations, changes and modifications can be made thereto. In other words, changes and modification can be made within the scope of the present disclosure, equivalents thereof and/or state-of-the art. Therefore, the description proposed herein is just a preferable example for the purpose of illustrations only, so other embodiments realized in a different state known to those skilled in the art and various modifications required depending on particular applications and uses can be made. Therefore, the description is not intended to limit the scope of the disclosure.

What is claimed is:

1. A separator for an electrochemical device comprising: a porous polymer substrate; a porous coating layer formed on at least one surface of the porous polymer substrate and including inorganic particles and a binder polymer said porous coating layer being present between the porous polymer substrate and an electrode adhesive layer, which electrode adhesive layer is formed on the outermost surface of the separator and comprises organic particles and a vitrified acrylic resin binder, wherein vitrified acrylic resin fixes and binds organic particles to form a film-shaped electrode adhesive layer, wherein the vitrified acrylic resin binder is present in an amount of 30-80 wt % based on a combined weight of the organic particles and vitrified acrylic resin binder, wherein the vitrified acrylic resin binder is any one or at least two selected from the group consisting of ethyl acrylate-acrylic acid-N,N-dimethylacrylamide copolymer, ethyl acrylate-acrylic acid-2-(dimethylamino) ethyl acrylate copolymer, ethyl acrylate-acrylic acid-N,N-diethylacrylamide copolymer and ethyl acrylate-acrylic acid-2-(diethylamino)ethyl acrylate copolymer, wherein the organic particles have an average diameter smaller than that of the pores formed in the porous coating layer located directly under the electrode adhesive layer, wherein the organic particles are not introduced into the pores of the porous coating layer but are located on the surface to form the electrode adhesive layer, and wherein the electrode adhesive layer has voids formed among the organic particles.

2. The separator for an electrochemical device according to claim 1, wherein the organic particles are any one or at least two polymers or copolymers selected from the group consisting of polyvinylidene fluoride, polyvinylidene fluoride-co-hexafluoropropylene, polyvinylidene fluoride-co-trichloroethylene, polymethyl methacrylate, polyacrylonitrile, polyvinyl acetate, polyethylene-co-vinyl acetate, polyimide and polyethylene oxide.

3. The separator for an electrochemical device according to claim 1, wherein the organic particles have an average particle diameter of 0.05-0.5 μm.

4. The separator for an electrochemical device according to claim 1, wherein the vitrified acrylic resin binder has a glass transition temperature of −50 to 60° C.

5. The separator for an electrochemical device according to claim 1, wherein the electrode adhesive layer is formed in a film shape in at least 20% of the surface area of the separator.

6. The separator for an electrochemical device according to claim 1, wherein the electrode adhesive layer has a thickness of 0.01-1.0 μm.

7. The separator for an electrochemical device according to claim 1, wherein the electrode adhesive layer is formed in at least 20% and 80% or less of the surface area of the separator.

8. An electrochemical device comprising a positive electrode, a negative electrode and a separator interposed between the positive electrode and the negative electrode, wherein the separator is the separator as defined in claim 1.

9. The electrochemical device according to claim 8, which is a lithium secondary battery.

* * * * *